United States Patent [19]
Christensen

[11] Patent Number: 5,968,591
[45] Date of Patent: Oct. 19, 1999

[54] METHODS AND COMPOSITIONS FOR PREVENTING CORROSION WITHIN SALT-WATER COOLED INTERNAL COMBUSTION ENGINES

[75] Inventor: Richard A. Christensen, Port Charlotte, Fla.

[73] Assignee: Extend-a-Life, Inc., Port Charlotte, Fla.

[21] Appl. No.: 09/052,387

[22] Filed: Mar. 31, 1998

Related U.S. Application Data

[60] Provisional application No. 60/042,152, Mar. 31, 1997.

[51] Int. Cl.$^6$ ................................. B05D 7/22; B08B 9/00
[52] U.S. Cl. ......................... 427/238; 427/239; 427/384; 134/22.11; 134/22.12; 134/22.14; 134/22.19
[58] Field of Search ..................................... 427/238, 384, 427/239; 124/22.11, 22.12, 22.14, 22.19

[56] References Cited

U.S. PATENT DOCUMENTS

| | | | |
|---|---|---|---|
| 5,204,012 | 4/1993 | Schaffhausen | 252/52 A |
| 5,756,435 | 5/1998 | Carey et al. | 508/550 |
| 5,863,302 | 1/1999 | Carey et al. | 44/387 |

*Primary Examiner*—Janyce Bell
*Attorney, Agent, or Firm*—McDonnell Boehnen Hulbert & Berghoff

[57] ABSTRACT

Disclosed are methods and compositions for removing, inhibiting, or preventing corrosion on metal surfaces within water channels in salt-water cooled internal combustion engines. These methods comprise contacting the metal surfaces with an aqueous mixture of a di- lower alkyl fatty acid amide.

12 Claims, 1 Drawing Sheet

METHODS AND COMPOSITIONS FOR PREVENTING CORROSION WITHIN SALT-WATER COOLED INTERNAL COMBUSTION ENGINES

This is a continuation of application Ser. No. 60/042,152, filed Mar. 31, 1997.

BACKGROUND OF THE INVENTION

1. Field of the Invention

This invention relates to methods, compositions, and apparatus for use in preventing or inhibiting corrosion within internal combustion marine outboard and/or inboard engines. More specifically, this invention relates to preventing or inhibiting corrosion within water channels in salt-water cooled internal combustion marine outboard and/or inboard engines.

2. Description of the Related Art

Water-cooled marine outboard/inboard engines used in salt-water environments experience rapid mineral deposit buildup (scales) resulting in substantial amounts of corrosion within the engine internal water cooling channels. Such deposits and corrosion reduce the efficiency of the engine cooling system and reduce engine life. Therefore, outboard and inboard engines used in salt-water environments typically require various treatments to remove these mineral deposit buildups (scales) and corrosive deposits.

However, frequent removal of the deposits and corrosion is inconvenient, difficult and costly since the deposits and corrosion are generally located in portions of the engine that are difficult to reach. Further, removal of these deposits and corrosion is very time consuming. Accordingly, need exists for methods and compositions suitable for removing the buildup quickly and efficiently as well as for preventing subsequent development of corrosion on the metal surfaces within the water channels.

SUMMARY OF THE INVENTION

In a broad aspect, the invention provides methods for inhibiting corrosion on metal surfaces that are contacted by salt water, and, in particular, sea water.

In one aspect, the invention provides methods for preventing or inhibiting corrosion on metal surfaces within water channels in salt-water cooled internal combustion marine outboard and/or inboard engines. These methods comprise contacting the metal surfaces with an aqueous mixture of a di-lower alkyl fatty acid amide.

In another aspect, the invention provides methods for removing salt deposits from metal surfaces within water channels in a salt-water cooled internal combustion engine. This method also comprises contacting the metal surfaces with an aqueous mixture of a di-lower alkyl fatty acid amide. The fatty acid amide, when delivered at the correct rate and concentration into the water channels of the engine cooling system, chelates and disperses mineral buildup. The engine cooling system then operates more efficiently leading to reduced wear on the engine and, therefore, increases engine life.

Accordingly, a preferred aspect of the invention provides methods for removing salt deposits mineral deposits or mineral buildup (scales) from metal surfaces within water channels in salt-water cooled internal combustion engines and for simultaneously inhibiting development of corrosion on the metal surfaces. In this aspect, the method comprises contacting the metal surfaces with the aqueous mixture of a di-lower alkyl fatty acid amide.

In another aspect of the invention, an apparatus or delivery system is provided for providing the aqueous mixture of di- lower alkyl fatty acid amide to the internal water channels of the engine.

In yet another aspect the invention provides a method for sealing the engine block that effectively inhibits corrosion within the water channels of the engine.

Surprisingly, the aqueous amide compositions of the invention provide excellent resistance to inhibition and/or prevention of the development of scale deposits and corrosion in the water channels of salt-water cooled internal combustion engines. Improvements compared to flushing the water channels with fresh water alone are dramatic and result in substantial reductions in engine wear.

The invention, therefore, provides convenient and efficient methods for preventing corrosion and removal of mineral deposits from outboard and inboard engines and for preventing subsequent corrosion in such engines.

DETAILED DESCRIPTION OF THE INVENTION

Figure 1:
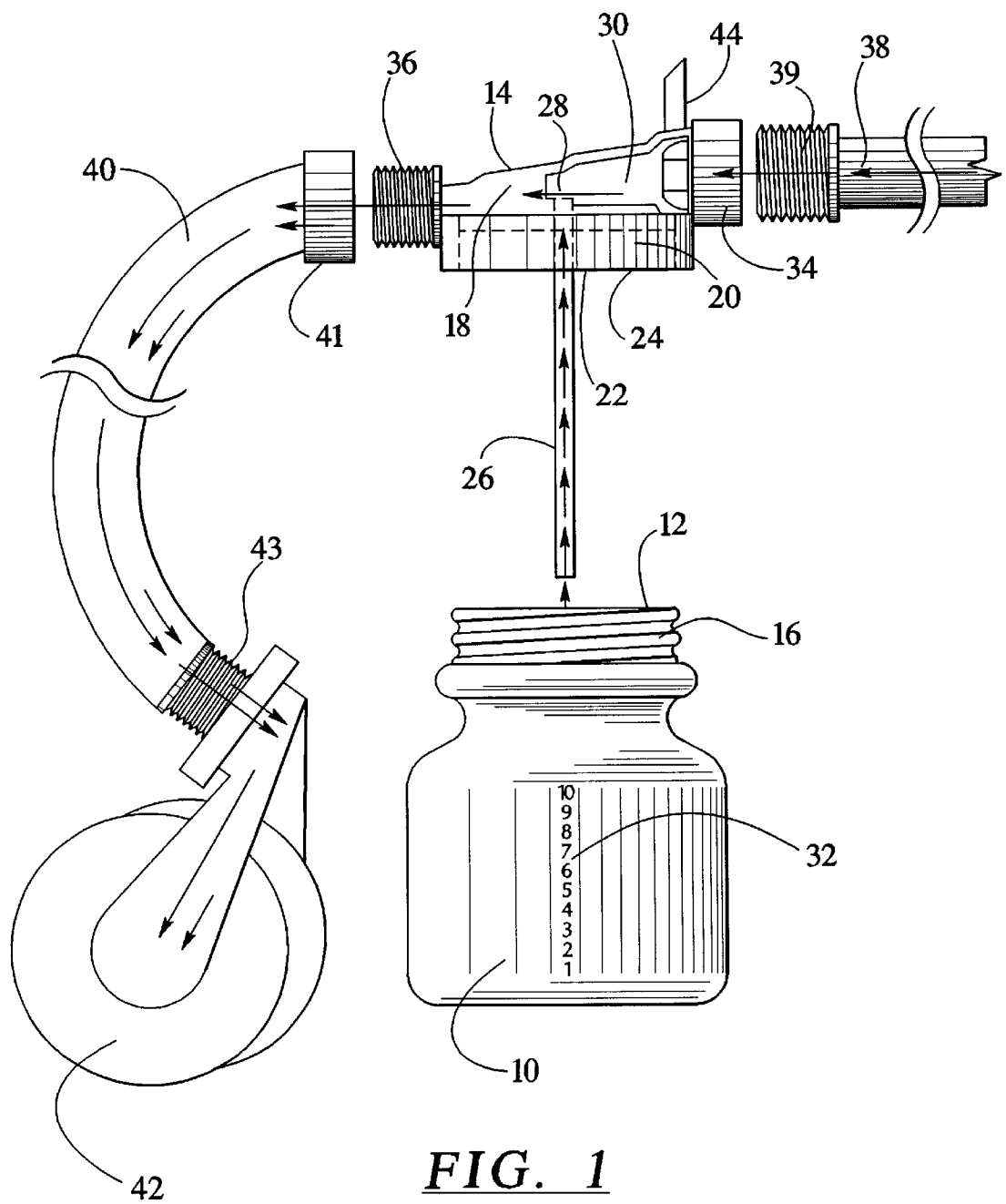
FIG. 1 is a partial cutaway, side-view of a delivery system according to the invention.

As mentioned above, the invention provides methods for preventing or inhibiting development of corrosion on metal surfaces within the water channels of water cooled, preferably salt-water cooled, internal combustion engines. These methods comprise contacting the metal surfaces with aqueous mixtures of a di-lower alkyl fatty acid amide. The invention can also be employed with engines using fresh water as a coolant.

In addition, methods are provided for removing or cleaning salt deposits from metal surfaces within the water channels. This method also comprises contacting the metal surfaces with the aqueous mixture of the fatty acid amide. Further the invention provides methods for applying an sealant to the engine block water channels. This method also comprises contacting the di-lower alkyl fatty acid amide with the metal surfaces.

Preferred methods according to the invention are those where mineral or salt deposits buildup (scales) are removed from the water channel metal surfaces while simultaneously depositing on the metal surfaces an amount of the di-lower alkyl fatty acid amide effective to prevent corrosion when salt-water contacts these surfaces. Preferably, the engine is treated and cleaned according to the invention after each use.

By water channels is meant areas in a water cooled internal combustion engine within the water cooling system. These areas include, for example, the lower unit water pump, water cylinder liners, the water jacket surrounding the engine head and other parts in the cooling system.

By lower alkyl fatty acid amide as used herein is meant compounds of the formula

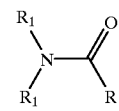

where each $R_1$ is independently straight or branched chain lower alkyl having from one to four carbon atoms; and
R represents a saturated or unsaturated hydrocarbyl group containing from average of about 10 to 27 carbon atoms.

Preferred di-lower alkyl fatty acids are those where $R_1$ is methyl.

More preferably, the di-lower alkyl fatty acids have the formula:

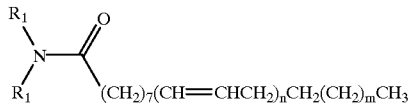

where each $R_1$ represents methyl;

n is 0 or an integer of from 1–3; and m is 0 or an integer of from 1–8.

The fatty acid amides suitable for use herein are commercially available from a variety of sources. For example, suitable dialkyl fatty acid amides can be obtained from Buckman Laboratories, Inc., Memphis, Tenn. Alternatively, the fatty acid amide can be manufactured by the reaction of a dialkyl amine with a naturally occurring fatty acid having from 10 to 27 carbon atoms. Suitable naturally occurring fatty acids are saturated or unsaturated.

A preferred composition for use in the inventive methods herein comprises at least about a 300 ppm of the fatty acid amide in water. In preferred embodiments, the compositions is delivered into the water channels at a pressure of from 10–20 psi. The amount of the amide can be adjusted upward as needed for more difficult removal or dispersion of mineral buildup and for enhanced corrosion prevention or inhibition. These aqueous fatty acid amide compositions are preferably made by mixing the amide with fresh water, and more preferably with water that is low or substantially free of sodium, potassium, magnesium, calcium, or chloride or carbonate ions.

The di-lower alkyl fatty acid amide may be used on all types of metal surfaces in the channels of water cooled marine engines, including, for example, aluminum or aluminum alloys, copper, copper alloys, lead, cast iron, and steel.

The aqueous mixture of di-lower alkyl fatty acid amide may be injected into the water channels of the water cooled internal combustion marine engine by a variety of methods.

BRIEF DESCRIPTION OF THE DRAWING

The FIGURE shows an apparatus for delivery of the aqueous mixtures in this invention.

A preferred apparatus for use in this invention is depicted in FIG. 1. The preferred apparatus or delivery system as shown in FIG. 1 for delivering the aqueous mixture comprises tank 10, preferably a plastic mixing jar, removably attached at the upper lip 12 of plastic mixing jar 10 to cap assembly 14. Upper lip 12 of jar 10 preferably includes threads 16. Cap assembly 14 comprises a tube 18 and a rim 20 defining aperture 22. Rim 20 is preferably provided with threads 24 on its inner surface for mating with threads 16 on jar 10 to secure assembly 14 to tank 10. Rim 20 of cap assembly 14 is further attached to tube 18 such that threads 24 are substantially perpendicular to the linear axis of tube 18. During use, the linear axis of tube 18 is preferably in a substantially horizontal orientation.

Cap assembly 14 is further provided with at least one dip tube 26 extending into jar 10. Dip tube 26 connects at orifice 28 generally opening into a portion of tube 18 adjacent sleeve 30. In preferred embodiments, dip tube 26 has a minimum diameter of about 3/16$^{th}$ of an inch. Jar 10 has a capacity capable of containing an amount of the concentrated amide required to supply up to about ten gallons of aqueous di-lower alkyl fatty acid amide at a concentration of about 300 ppm amide in water. For example, jar 10 may contain about 10 ounces of a 20% w/w solution of the amide in water.

Jar 10 is preferably formed from a clear or opaque material such that the level of the contents can be viewed. For example, jar 10 may be formed from a polymeric material such as, for example, polyethylene terephthalate (PETE). Jar 10 preferably includes a scale or graduated markings 32 on its exterior in either the metric or english system of measurement, e.g., in milliliters or ounces. For example, the graduations 32 may indicate amounts of from 1 to 10 ounces.

Cap assembly 14 may be prepared from a suitable metal, metal alloy, or polymer material. Dip tube 26 is preferably prepared from any suitable polymeric material, i.e., plastic.

Cap assembly 14 includes water input hose fitting 34 and output fitting 36. In a preferred embodiment, each of water input hose fitting 34 and output fitting 36 are threaded to receive corresponding male or female threads for accepting water supply hose 38 and outlet hose 40, respectively. Hose 40 is preferably about 6 feet in length. In a particularly preferred embodiment, water input hose fitting 34 is a female threaded fitting for connecting hose 38 via fitting 39 to via fitting 41 cap assembly 14, and output fitting 36 is a male threaded fitting for connecting cap assembly 14 to the proximal end of outlet hose 40. Outlet hose 40 (preferably six feet in length) is preferably terminated at its distal end 43 with nozzle 42. The nozzle 42 is made such that it is easily installed on all engine water intakes. Nozzle 42 must however be properly sized to allow the aqueous amide mixture to be delivered into the water channels of the engine.

During operation of a preferred embodiment of the invention, about ten ounces of a 20% w/w aqueous solution of the amide are added to jar 10. The 20% solution may be prepared by diluting two ounces of 100% di-lower alkyl fatty acid amide with about 8 ounces of water. Alternatively, since 50% w/w aqueous solutions of the amide are commercially available, about four ounces of such a solution may be combined with an appropriate amount of water to yield the 20% solution. Graduations 32 on jar 10 are readily used by the operator to measure an amount of the aqueous amide sufficient to treat the engine of interest. Dip tube 26 meters an appropriate amount of the aqueous amide to be combined with water in tube 18 to produce an at least 300 ppm aqueous mixture of the amide. Amide in jar 10 is drawn into to dip tube 26 when water flow is directed through the tube 18 allowing for mixing of water and amide in tube 18. Thus, a suitably mixed amide composition is directed into outlet hose 40 and to nozzle 42. Nozzle 42 is typically attached to the water intake of an outboard or inboard engine. Preferably, the mixture is directed into the water channels at a flow rate of up to about 1 gallon per minute. Suitable pressure for introduction of the amide mixture into the water channels is up to about 20, preferably about 10–20 psi. Preferably, the appropriate amount of aqueous amide is delivered into the water channels of the engine in about ten minutes.

As can be seen from FIG. 1, the preferred apparatus or delivery system is similar to commercially available chemical applicators. The apparatus for use in the invention can be viewed as a commercially available chemical applicator adapted for attachment to a, preferably 6' in length, outlet hose 40 at its output fitting 36.

For use with small outboard engines, the aqueous amide composition is best poured into a tank large enough to have the lower unit of an engine and the engine subsequently allowed to run for about a ten minutes drawing the aqueous amide into the engine water channels.

The invention is illustrated further by the following example which is not to be construed as limiting the invention in scope or spirit to the specific procedures and compounds described therein.

EXAMPLE 1

About four fluid ounces of aqueous di-lower alkyl fatty acid amide (commercially available 50% active) is poured into a 10-ounce plastic mixing jar, 10. Six ounces of water are then added to dilute the amide to about 20% active material. The male end of a six foot outlet hose 40 is connected to water nozzle 42 which is in turn attached to the water intake of the outboard engine. The female end of outlet hose 40 is connected to fitting 36 of cap assembly 14. A water supply hose 38 is then connected to water input hose fitting 34. The mixing jar 10 is then attached to cap assembly 14 whereby the delivery system is ready for use.

The water supply to hose 38 is turned on. Lever 44 is then moved to an on position allowing water to flow through tube 18 which mixes with di-lower alkyl fatty acid amide provided from jar 10. Thus an about 300 ppm solution of aqueous amide is provided to hose 40 and nozzle 42 and the outboard engine is started. The 300 ppm solution is thus directed into the engine water intake and through the channels of the cooling system. This process is continued until the entire volume of aqueous amide in jar 10 is consumed, i.e., about ten minutes. After the amide mixture has been consumed, the engine is turned off, lever 44 being moved to the off position and, finally, the water supply is turned off.

The engine has now been cleaned and treated with an amount of the amide effective to remove scales and to prevent or inhibit corrosion. This procedure is preferably used each instance the boat or engine leaves the water.

The invention and the manner and process of making and using it, are now duscribed in such full, clear, concise and exact terms as to enable any person skilled in the art to which it pertains, to make and use the same. It is to be understood that the foregoing describes preferred embodiments of the present invention and that modifications may be made therein without departing from the spirit or scope of the present invention as set forth in the claims. To particularly point out and distinctly claim the subject matter regarded as invention, the following claims conclude this specification.

What is claimed is:

1. A method for preventing or inhibiting corrosion and scale buildup on metal surfaces within water channels in a salt-water cooled internal combustion engine, the method comprising contacting the metal surfaces with an aqueous mixture of a di-lower alkyl fatty acid amide.

2. A method according to claim 1, wherein water forming the aqueous mixture is substantially free of sodium, potassium, and chloride ions.

3. A method according to claim 1, wherein the aqueous mixture contains at least about 300 ppm of the of fatty acid amide.

4. A method according to claim 3, wherein the aqueous mixture of fatty acid amide is delivered into the water channels at a pressure of about 10 to 20 psi.

5. A method according to claim 3, wherein the aqueous mixture of fatty acid amide is delivered into the water channels at a rate of about 1 gallon per minute.

6. A method for removing salt deposits from metal surfaces within water channels in a salt-water cooled internal combustion engine, the method comprising contacting the metal surfaces with an aqueous mixture of a di-lower alkyl fatty acid amide.

7. A method according to claim 6, wherein water forming be aqueous mixture is substantially free of sodium, potassium, and chloride ions.

8. A method according to claim 6, wherein the aqueous mixture contains at least about 300 ppm of the fatty acid amide.

9. A method according to claim 8, wherein the aqueous mixture of fatty acid amide is delivered into the water channels at a pressure of about 10 to 20 psi.

10. A method according to claim 8, wherein the aqueous mixture of fatty acid amide is delivered into the water channels at a rate of about 1 gallon per minute.

11. A method according to claim 6, wherein the amide composition is delivered at a rate suitable to allow the amide to solubilize and sequester or chelate salt deposits or other mineral deposits on the metal surfaces.

12. A method according to claim 6, further comprising forming a protective coating of the amide on the metal surfaces of the water channels effective to prevent or inhibit oxidation at the metal surfaces.

\* \* \* \* \*